US008655515B2

(12) United States Patent
Noffsinger et al.

(10) Patent No.: US 8,655,515 B2
(45) Date of Patent: *Feb. 18, 2014

(54) COMMUNICATION SYSTEM FOR A RAIL VEHICLE CONSIST AND METHOD FOR COMMUNICATING WITH A RAIL VEHICLE CONSIST

(75) Inventors: Joseph Forrest Noffsinger, Grain Valley, MO (US); Robert Foy, Melbourne, FL (US); Brian McManus, Melbourne, FL (US); Stephen Smith, Melbourne, FL (US); John Brand, Melbourne, FL (US); Jared Klineman Cooper, Palm Bay, FL (US); Kevin Kapp, Melbourne, FL (US); Kaitlyn Hrdlicka, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 483 days.

This patent is subject to a terminal disclaimer.

(21) Appl. No.: 12/955,583

(22) Filed: Nov. 29, 2010

(65) Prior Publication Data

US 2012/0136514 A1 May 31, 2012

(51) Int. Cl.
*G05D 1/00* (2006.01)

(52) U.S. Cl.
USPC .......................................................... 701/19

(58) Field of Classification Search
USPC .......................................................... 701/19
See application file for complete search history.

(56) References Cited

U.S. PATENT DOCUMENTS

| | | |
|---|---|---|
| 6,400,281 B1 | 6/2002 | Darby, Jr. et al. |
| 2003/0210671 A1 | 11/2003 | Eglin |
| 2005/0160169 A1 | 7/2005 | Segal et al. |
| 2008/0087772 A1* | 4/2008 | Smith ........................ 246/187 C |
| 2010/0070116 A1* | 3/2010 | Kumar et al. .................... 701/19 |
| 2010/0131127 A1* | 5/2010 | DeSanzo ......................... 701/19 |
| 2010/0168942 A1* | 7/2010 | Noffsinger et al. ............. 701/21 |
| 2010/0174484 A1* | 7/2010 | Sivasubramaniam et al. .............................. 701/213 |
| 2011/0186692 A1* | 8/2011 | Kumar et al. ................ 246/29 R |
| 2012/0078454 A1* | 3/2012 | Kumar ............................ 701/19 |

FOREIGN PATENT DOCUMENTS

| | | |
|---|---|---|
| EP | 1601136 A1 | 11/2005 |
| WO | 0171942 A2 | 9/2001 |

OTHER PUBLICATIONS

Search Report and Written Opinion from corresponding PCT Application No. PCT/US2011/059685 dated Apr. 16, 2012.

* cited by examiner

*Primary Examiner* — Hussein A. Elchanti
(74) *Attorney, Agent, or Firm* — GE Global Patent Operation; John A. Kramer

(57) ABSTRACT

A communication system for a rail vehicle consist includes antenna modules, routing modules, and an arbitration module. The antenna modules are disposed at spaced apart locations along the consist and receive network data from an off-board device. The routing modules are communicatively coupled with the antenna modules and receive the network data from the antenna modules. The routing modules are communicatively coupled with a network connection extending along the rail vehicle consist. The arbitration module is communicatively coupled with the network connection. The arbitration module forms a message represented by the network data. One or more of the routing modules transmits the network data received from the off-board device to the arbitration module over the network connection. The arbitration module receives the network data to form the message and transmits the message to one or more powered units of the rail vehicle consist through the network connection.

20 Claims, 7 Drawing Sheets

COMMUNICATION SYSTEM FOR A RAIL VEHICLE CONSIST AND METHOD FOR COMMUNICATING WITH A RAIL VEHICLE CONSIST

CROSS-REFERENCE TO RELATED APPLICATIONS

This application is related to U.S. patent application Ser. No. 12/955,710, filed on Nov. 29, 2010, and entitled "Communication System For A Rail Vehicle Consist And Method For Communicating With A Rail Vehicle Consist" (the "'710 Application"). The entire subject matter of the '710 Application is incorporated by reference herein.

BACKGROUND

One or more embodiments of the subject matter described herein relate to data communications and, more particularly, to data communications with a rail vehicle.

Rail vehicles may include multiple powered units, such as locomotives, that are mechanically coupled or linked together in a consist. The consist of powered units operates to provide tractive and/or braking efforts to propel and stop movement of the rail vehicle. The powered units in the consist may change the supplied tractive and/or braking efforts based on a data message that is communicated to the powered units. For example, the supplied tractive and/or braking efforts may be based on Positive Train Control (PTC) instructions or control information for an upcoming trip. The control information may be used by a software application, such as Trip Optimizer™ from General Electric Company, to determine the speed of the rail vehicle for various segments of an upcoming trip of the rail vehicle.

The data message having the information used to control the tractive and/or braking efforts may be communicated to the rail vehicle while the rail vehicle is moving. For example, wayside equipment may wirelessly transmit the data message to an antenna of the rail vehicle.

However, as the rail vehicles move relative to the wayside equipment, the wireless transmission of the data message is subject to several propagation problems. These problems include, but are not limited to, the existence of dead spots or low signal areas where little to no data message is transmitted but through which the rail vehicle travels, reduced transmission rates due to the need to re-transmit lost data, and the like. Additional problems associated with wireless transmission of data messages include atmospheric interference, mechanical failure of the receiving antenna, and the like.

A need exists for a system and method for communicating with a rail vehicle that avoids one or more of the above shortcomings.

BRIEF DESCRIPTION

In one embodiment, a communication system for a rail vehicle consist is provided. The communication system includes antennas, routing modules, and an arbitration module. The antennas are configured to be disposed at spaced apart locations along the rail vehicle consist and to receive network data from an off-board device. The routing modules are communicatively coupled with the antennas and are configured to receive the network data from the antennas. The routing modules are communicatively coupled with a network connection extending along the rail vehicle consist. The arbitration module is communicatively coupled with the network connection. The arbitration module is configured to form a message represented by the network data. One or more of the routing modules transmits the network data received from the off-board device to the arbitration module over the network connection. The arbitration module receives the network data to form the message and transmits the message to one or more powered units of the rail vehicle consist through the network connection.

In another embodiment, a method for communicating with a rail vehicle consist is provided. The method includes receiving network data from an off-board device at one or more of a plurality of antennas disposed at spaced apart locations along the rail vehicle consist. The method also includes communicating the network data to an arbitration module through a network connection that extends along the rail vehicle consist and forming a message from the network data received over the network connection at the arbitration module. The method further includes transmitting the message to one or more powered units of the rail vehicle consist through the network connection.

In another embodiment, a computer readable storage medium for a communication system of a rail vehicle consist is provided. The computer readable storage medium includes instructions for directing a processor of the communication system to receive network data transmitted by an off-board device and obtained by one or more of a plurality of antennas disposed at spaced apart locations along the rail vehicle consist. The instructions also direct the processor to examine the network data to identify a message represented by the network data and transmit the message to one or more powered units of the rail vehicle consist along a network connection extending along the rail vehicle consist based on the message.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
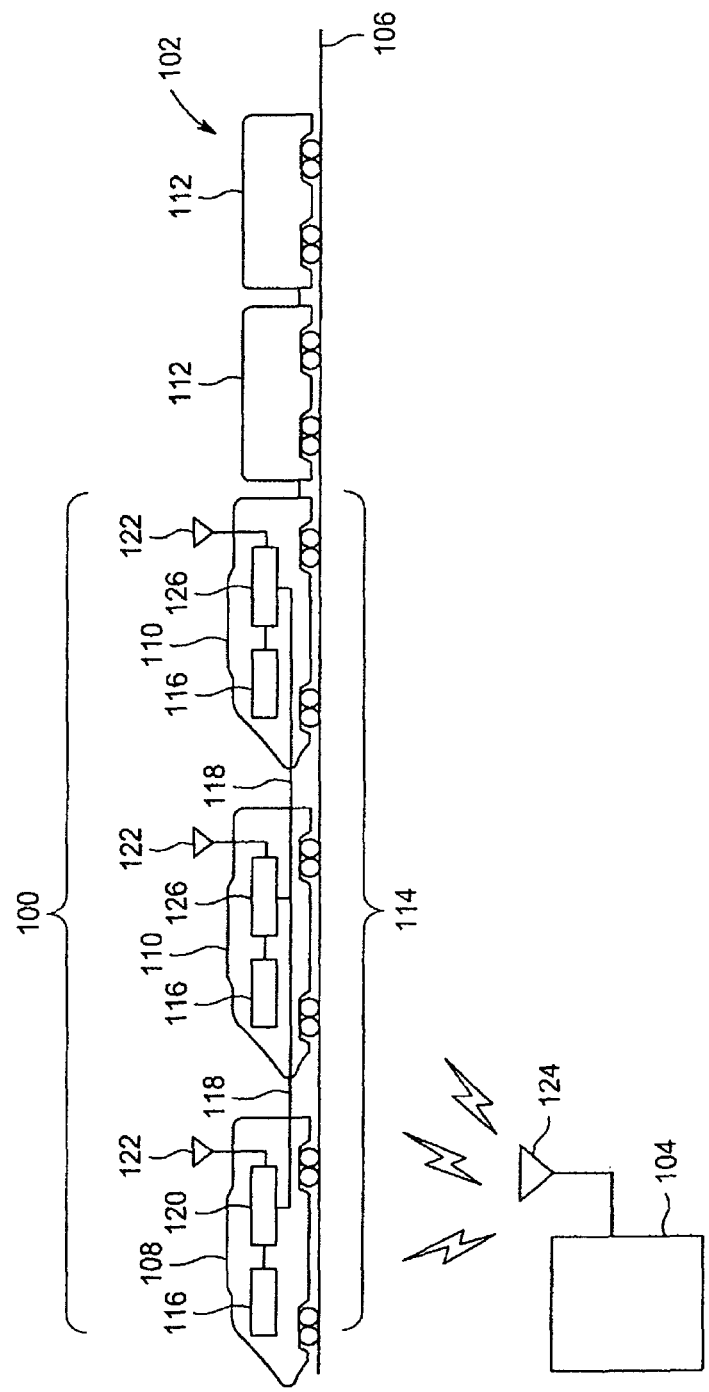
FIG. 1 is a schematic diagram of one embodiment of a communication system for a rail vehicle consist.

Reference will be made below in detail to example embodiments of the inventive subject matter, examples of which are illustrated in the accompanying drawings. Wherever possible, the same reference numerals used throughout the drawings refer to the same or like parts. Although example embodiments of the inventive subject matter are described with respect to trains, locomotives, and other rail vehicles, embodiments also may be applicable for use with vehicles generally, such as off-highway vehicles, agricultural vehicles, and/or transportation vehicles, each of which may include a vehicle consist. As noted above, a vehicle consist is a group of powered units (such as locomotives) or other vehicles that are mechanically coupled or linked together to travel along a route, with each vehicle in the consist being adjacent to one or more other vehicles in the consist.

At least one embodiment described herein provides for communication systems that transmit and/or receive data signals with a moving rail vehicle consist. The systems and methods described herein can provide for an increased success rate in transmitting a message to a moving rail vehicle consist over several data packets. The message may be wirelessly transmitted to several antenna modules disposed at spaced apart locations along the rail vehicle consist. The spaced apart locations of the antenna modules may increase the probability that at least one of the antenna modules will receive each transmitted data packet. The received data packets can be conveyed through a network connection of the rail vehicle consist to an arbitrating communication unit or arbitration module that reconstitutes the transmitted message from the received data packets. The message can be used to, among other things, control tractive and/or braking efforts of the rail vehicle consist.

One or more embodiments of the disclosed systems can be retrofitted to an existing consist of a rail vehicle consist. For example, antenna modules may be added to one or more locomotives or other cars of the rail vehicle and an existing multiple unit (MU) cable may be used to provide the network connection over which the received data packets and the reconstituted message are conveyed within the rail vehicle consist.

At least one technical effect of one or more embodiments described herein is the communication of data signals from an off-board device that transmits the data signals to spaced apart antenna modules on the rail vehicle consist, where the rail vehicle consist reconstitutes the subsets of the data signals received at the different antenna modules in order to control tractive operations of the rail vehicle consist.

FIG. 1 is a schematic diagram of one embodiment of a communication system 100 for a rail vehicle consist 102. As used herein, the term "rail vehicle" may mean plural rail cars (including powered and/or non-powered rail cars or units) linked together as a consist or a single rail car (a powered or unpowered rail car or unit). The communication system 100 provides for increased reliability in the communication of network data from an off-board device 104 and the rail vehicle consist 102. The communication system 100 may be used to convey a variety of network data to the rail vehicle consist 102, such as packetized data or information that is communicated in data packets, from the off-board device 104. The off-board device 104 can represent a wireless transmitter or transceiver disposed near a track 106 that the rail vehicle consist 102 travels along and that is configured to wirelessly transmit data messages to the rail vehicle consist 102. The messages may originate elsewhere, such as in a rail yard back office system, a remotely located server, a computer disposed in a rail yard tower, and the like, and be communicated to the off-board device 104 by wired and/or wired connections. Alternatively, the off-board device 104 may be a satellite that transmits the message down to the rail vehicle consist 102 or a cellular tower disposed remote from the rail vehicle consist 102 and the track 106. Other devices may be used as the off-board device 104 to wirelessly transmit the messages. For example, other wayside equipment or base stations may be used as the off-board device 104. By way of example only, the off-board device 104 may use one or more of the Transmission Control Protocol (TCP), Internet Protocol (IP), TCP/IP, User Datagram Protocol (UDP), or Internet Control Message Protocol (ICMP) to communicate network data with the rail vehicle consist 102. As described below, the network data can include information used to automatically and/or remotely control operations of the rail vehicle consist 102 and/or reference information stored and used by the rail vehicle consist 102 during operation of the rail vehicle consist 102.

The rail vehicle consist 102 includes several interconnected powered units 108, 110 and non-powered units 112. "Powered units" refers to rail cars that are capable of self-propulsion, such as locomotives. "Non-powered units" refers to rail cars that are incapable of self-propulsion, but which may otherwise receive electric power for other services. For example, cargo cars, passenger cars, and other types of rail cars that do not propel themselves may be "non-powered units," even though the cars may receive electric power for cooling, heating, communications, lighting, and the like.

In the illustrated embodiment, the powered units 108, 110 represent locomotives joined with each other in a locomotive consist 114. The locomotive consist 114 represents a group of two or more locomotives in the rail vehicle consist 102 that are mechanically coupled or linked together to travel along a route. The locomotive consist 114 may be a subset of the rail vehicle consist 102 such that the locomotive consist 114 is included in the rail vehicle consist 102 along with additional powered and/or non-powered units in the rail vehicle consist 102. While the rail vehicle 102 only includes a single locomotive consist 114, alternatively the rail vehicle 102 may include two or more locomotive consists 114 joined together or interconnected by one or more intermediate powered or non-powered units that do not form part of the locomotive consists 114.

The powered units 108, 110 include a lead powered unit 108, such as a lead locomotive, and one or more trailing powered units 110, such as trail locomotives. As used herein, the terms "lead" and "trailing" are designations of different powered units, and do not necessarily reflect positioning of the powered units 108, 110, 112 in the rail vehicle consist 102 or the locomotive consist 114. For example, a lead powered unit may be disposed between two trailing powered units. Alternatively, the term "lead" may refer to the first powered unit in the rail vehicle consist 102 or the locomotive consist 114 and "trailing" powered units refer to powered units positioned after the lead powered unit. In another embodiment, the term "lead" refers to a powered unit that is designated for primary control of the locomotive consist 114 and "trailing" refers to powered units that are under at least partial control of the lead powered unit.

The powered units 108, 110 include a connection at each end of the powered unit 108, 110 to couple propulsion subsystems 116 of the powered units 108, 110 such that the powered units 108, 110 in the locomotive consist 114 function together as a single tractive unit. The propulsion subsystems 116 include electric and/or mechanical devices and components used to provide tractive effort that propels the powered units 108, 110 and braking effort that slows the powered units 108, 110.

The propulsion subsystems 116 of the powered units 108, 110 in the locomotive consist 114 are connected and communicatively coupled with each other by a network connection 118. In one embodiment, the network connection 118 includes a net port and jumper cable that extends along the rail vehicle 102 and between the powered units 108, 110. The network connection 118 may be a cable that includes twenty seven pins on each end that is referred to as a multiple unit cable, or MU cable. Alternatively, a different wire, cable, or bus, or other communication medium, may be used as the network connection 118. For example, the network connection 118 may represent an Electrically Controlled Pneumatic (ECP) brake line, a fiber optic cable, or wireless connection.

The network connection 118 may include several channels over which network data is communicated. Each channel can represent a different pathway for the network data to be communicated. For example, different channels may be associated with different wires or busses of a multi-wire or multi-bus cable. Alternatively, the different channels may represent different frequencies or ranges of frequencies over which the network data is transmitted.

The powered units 108, 110 may include communication units 120, 126 that are used to control operations of the propulsion subsystems 116 of the powered units 108, 110. The communication unit 120 is disposed in the lead powered unit 108 and may be referred to as a lead communication unit. As described below, the lead communication unit 120 also may be the unit that handles arbitration of received data packets forming a message transmitted by the off-board device 104. As a result, the lead communication unit 120 alternatively may be referred to as an arbitrating communication unit. In another embodiment, another communication unit 126 may handle arbitration of the data packets and be referred to as the arbitrating communication unit. The communication units 126 are disposed in different trailing powered units 110 and may be referred to as trailing communication units. Alternatively, one or more of the communication units 120, 126 may be disposed outside of the corresponding powered units 108, 110, such as in a nearby or adjacent non-powered unit 112.

The communication units 120, 126 in the rail vehicle consist 102 can be connected with the network connection 118 such that the communication units 120, 126 are communicatively coupled with each other by the network connection 118 and linked together in a computer network. Alternatively, the communication units 120, 126 may be linked by another wire, cable, or bus, or be linked by one or more wireless connections. The networked communication units 120, 126 are referred to as an "intra-consist network."

The networked communication units 120, 126 include antenna modules 122. The antenna modules 122 represent separate individual antenna modules or sets of antenna modules disposed at different locations along the rail vehicle consist 102. For example, an antenna module 122 may represent a single wireless receiving device, such as a single 220 MHz TDMA antenna module, a single cellular modem, a single wireless local area network (WLAN) antenna module (such as a "Wi-Fi" antenna module capable of communicating using one or more of the IEEE 802.11 standards or another standard), a single WiMax (Worldwide Interoperability for Microwave Access) antenna module, a single satellite antenna module (or a device capable of wirelessly receiving a data message from an orbiting satellite), a single 3G antenna module, a single 4G antenna module, and the like. As another example, an antenna module 122 may represent a set or array of antenna modules, such as multiple antenna modules having one or more TDMA antenna modules, cellular modems, Wi-Fi antenna modules, WiMax antenna modules, satellite antenna modules, 3G antenna modules, and/or 4G antenna modules.

As shown in FIG. 1, the antenna modules 122 are disposed at spaced apart locations along the length of the rail vehicle consist 102. For example, the single or sets of antenna modules represented by each antenna module 122 may be separated from each other along the length of the rail vehicle consist 102 such that each single antenna module or antenna module set is disposed on a different powered or non-powered unit 108, 110, 112 of the rail vehicle consist 102. The antenna modules 122 receive network data that is communicated from the off-board device 104. For example, the off-board device 104 may include an antenna module 124 that wirelessly communicate the network data from a location that is off of the track 106 to the rail vehicle consist 102 via one or more of the antenna modules 122. Alternatively, the antenna modules 122 may be connectors or other components that engage a pathway over which network data is communicated. For example, if the network data is communicated as a differential signal over a running rail of the track 106 (such as the rail that some wheels of the rail vehicle consist 102 roll along), a powered or third rail of the track 106, and/or an overhead catenary that supplies power to the rail vehicle consist 102, the antenna modules 122 may represent connectors or pick ups that engage the rail or catenary in order to receive the network data communicated through the rail or catenary. The spaced apart antenna modules 122 provide diverse antenna modules or diversity receivers of the rail vehicle consist 102.

The diverse antenna modules 122 enable the rail vehicle consist 102 to receive the network data transmitted by the off-board device 104 at multiple locations along the rail vehicle consist 102. Increasing the number of locations where the network data can be received by the rail vehicle consist 102 can increase the probability that all, or a substantial portion, of a message conveyed by the network data is received by the rail vehicle consist 102. For example, if some antenna modules 122 are temporarily blocked or otherwise unable to receive the network data as the rail vehicle consist 102 is moving relative to the off-board device 104, other antenna modules 122 that are not blocked and are able to receive the network data may receive the network data.

Figure 2:
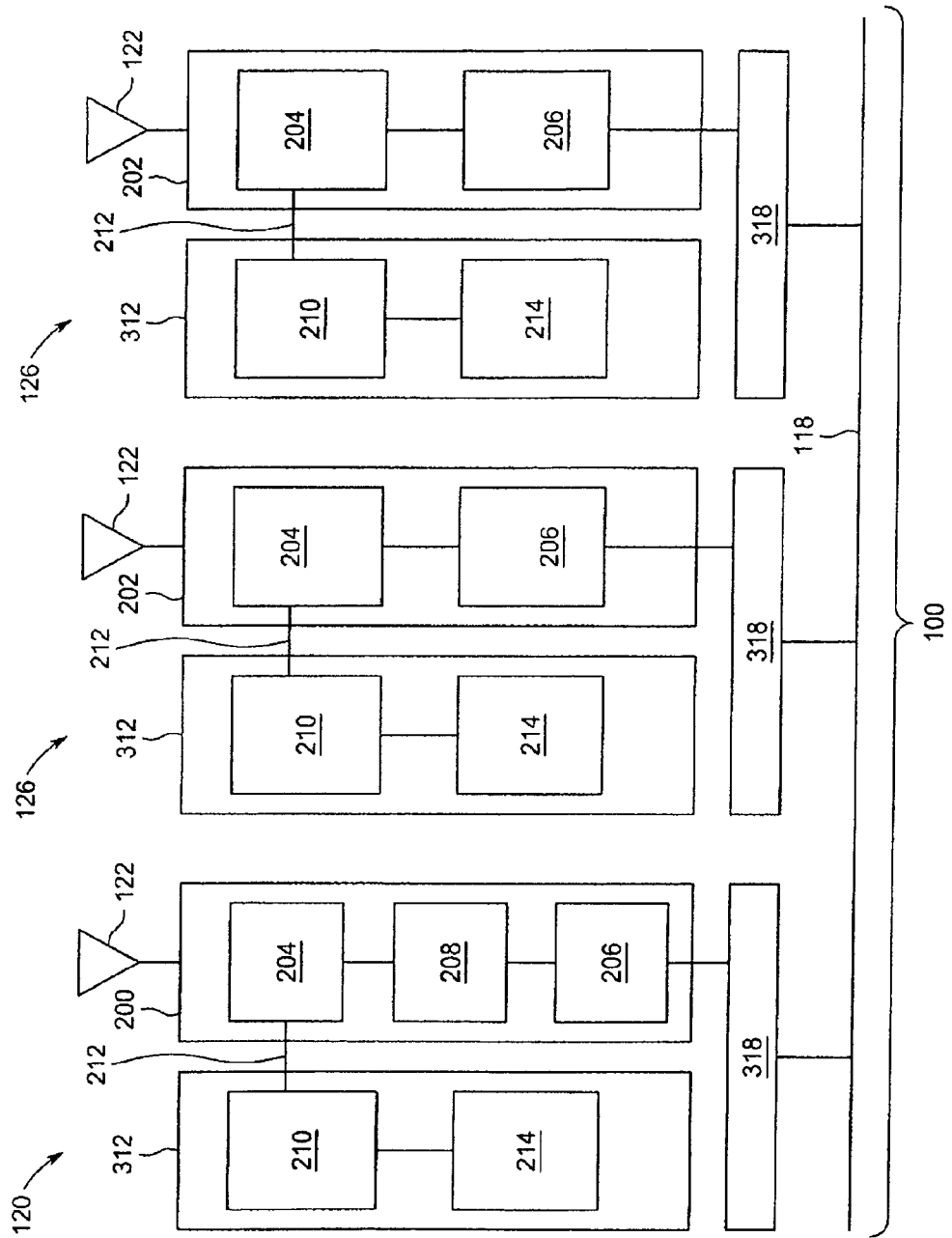
FIG. 2 is a schematic diagram of one embodiment of the communication system shown in FIG. 1.

FIG. 2 is a schematic diagram of one embodiment of the communication system 100. As shown in FIG. 2, the communication units 120, 126 of the powered units 108, 110 (shown in FIG. 1) of the rail vehicle consist 102 (shown in FIG. 1) are interconnected and communicatively coupled with each other by the network connection 118. The network connection 118 may include, or be embodied in, an MU cable or another conductive bus, wire, or cable, or by wireless connections between the communication units 120, 126. For example, the network connection 118 may be embodied in an Electronically Controlled Pneumatic (ECP) brake cable bus.

Figure 3:
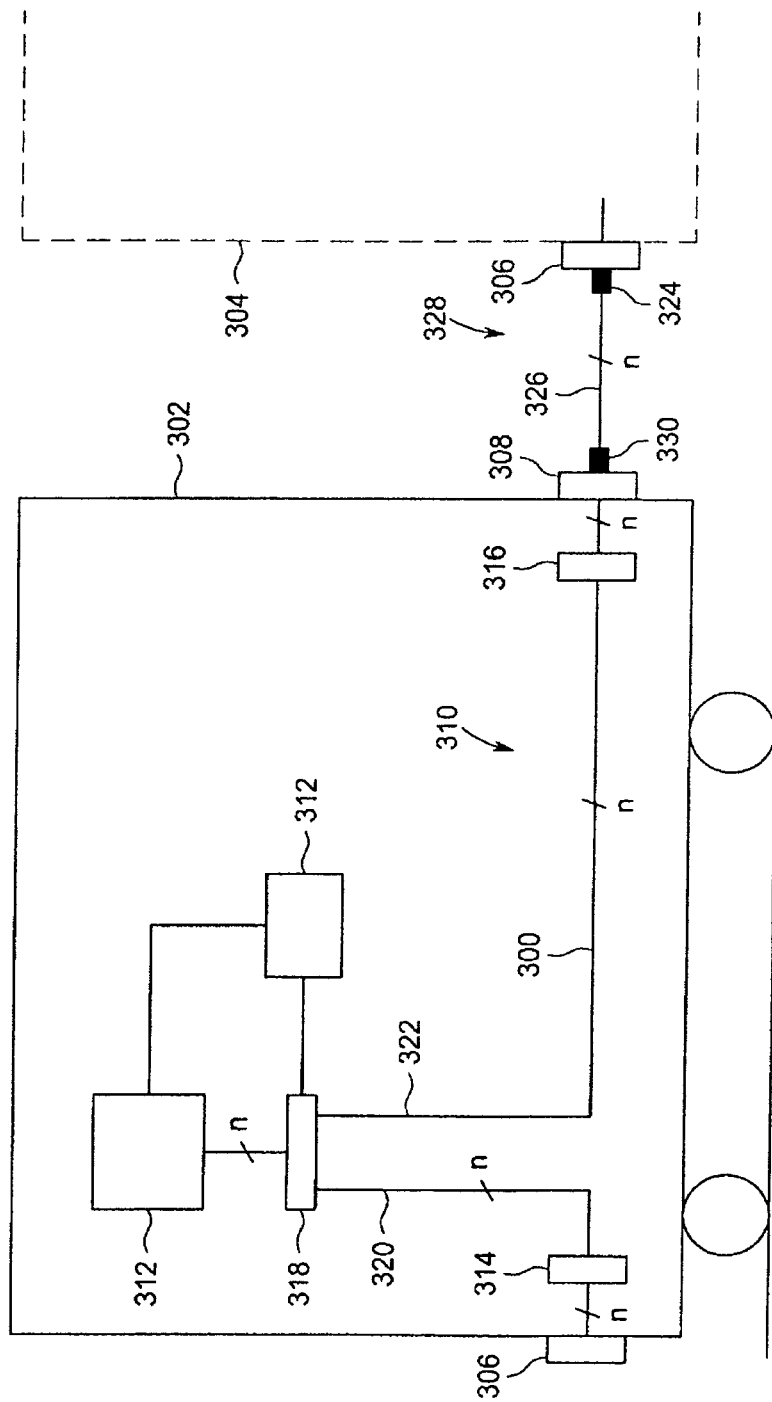
FIG. 3 illustrates one example of an MU cable bus that may be used as the network connection shown in FIG. 1.

FIG. 3 illustrates one example of an MU cable bus 300 that may be used as the network connection 118 (shown in FIG. 1). Other configurations of the network connection 118 or MU cable bus 300 are possible, depending on the type of rail vehicle consist 102 (shown in FIG. 1) and/or powered units 108, 110 (shown in FIG. 1) that are included in the rail vehicle consist 102. The MU cable bus 300 may be an existing electrical bus interconnecting a lead powered unit 302 (such as the lead powered unit 108) and one or more trailing powered units 304 (such as the trailing powered units 110) in the consist (such as the rail vehicle consist 102 or the locomotive consist 114 shown in FIG. 1).

The MU cable bus 300 includes a front port 306, a rear port 308, and an internal electrical system 310 that connects the front port 306 and the rear port 308 in each of the powered units 302, 304. The internal electrical system 310 includes one or more electronic components 312, such as the communication unit 120 or 126 (shown in FIG. 1). In the illustrated example, the internal electrical system 310 comprises a front terminal board 314 electrically connected to the front port 306, a rear terminal board 316 electrically connected to the rear port 308, a central terminal board 318, and first and second electrical conduit portions 320, 322 electrically connecting the central terminal board 318 to the front terminal board 314 and the rear terminal board 316, respectively. The central terminal board 318, front terminal board 314, and rear terminal board 316 may each comprise an insulating base (attached to the powered unit 302, 304) on which terminals for wires or cables have been mounted. This provides flexibility in terms of connecting different electronic components to the MU cable bus 300.

The electronic components 312 may be electrically connected to the central terminal board 318 and to the MU cable bus 300. Although the front port 306 and the rear port 308 may be located generally at the front and rear of the powered unit 302, the front and/or rear ports 306, 308 may be located elsewhere and designations such as "front," "rear," "central," are not meant to be limiting but are instead provided for identification purposes.

The MU cable bus 300 includes a cable jumper 328. The jumper 328 includes opposite plug ends 322, 324 and a flexible cable portion 326 electrically and mechanically connecting the plug ends 322, 324. The plug ends 322, 324 mate with the ports 308, 306. The cable jumper 328 may be electrically symmetrical, meaning either plug end 322, 324 can be attached to either port 306, 308. The cable jumper 328 is used to electrically interconnect the internal electrical systems 310 of adjacent powered units 302, 304. As such, for each adjacent pair of powered units 302, 304, one plug end 322 of the cable jumper 328 is attached to the rear port 308 of the front powered unit 302 and the other plug end 324 of the cable jumper 328 is attached to the front port 306 of the rear powered unit 304. The flexible cable portion 326 of the cable jumper 328 extends between the two plug ends 322, 324, providing a flexible but secure electrical connection between the powered units 302, 304.

Depending on the particular type and configuration of the powered units 302, 304, the electrical conduit portions 320, 322 and cable jumpers 328 may be configured in different manners, in terms of the number "n" ("n" is a real whole number equal to or greater than 1) and type of discrete electrical pathways included in the conduit portions 320, 322 or cable jumper 328. In one example, each conduit portion 320, 322 and the cable jumper 328 comprises a plurality of discrete electrical wires, such as 12-14 gauge copper wires. In another example, the cable portion 326 of the cable jumper 328 includes a plurality of discrete electrical wires, while the conduit portions 320, 322 each include one or more discrete electrical wires and/or non-wire electrical pathways, such as conductive structural components of the locomotive, pathways through or including electrical or electronic components, circuit board traces, or the like. Although certain elements in FIG. 3 are shown as including "n" discrete electrical pathways, it should be appreciated that the number of discrete pathways in each element may be different, i.e., "n" may be the same or different for each element.

As described above, the plug ends 322, 324 of the cable jumper 328 fit into the ports 306, 308. For this purpose, the plug ends 322, 324 and ports 306, 308 are complementary in shape to each other, both for mechanical and electrical attachment. The plug end 322, 324 may include a plurality of electrical pins, each of which fits into a corresponding electrical socket in a corresponding port 306, 308. The number of pins and sockets may depend on the number of discrete electrical pathways extant in the internal electrical conduits 320, 322, cable jumpers 328, etc. In one example, each plug end 322, 324 is a twenty seven-pin plug.

The term "MU cable bus" refers to the entire MU cable bus or any portion(s) thereof, e.g., terminal boards, ports, jumper cable, conduit portions, and the like. As should be appreciated, when two locomotives are connected via the cable jumper 328, both the cable jumper 328 and the internal electrical systems 310 form the MU cable bus 310. As subsequent powered units are attached using additional cable jumpers 328, those cable jumpers 328 and the internal electrical systems 310 of the subsequent powered units also become part of the MU cable bus 310.

Returning to the discussion of the communication system 100 shown in FIG. 2, the communication units 120, 126 may be communicatively coupled by the MU cable bus 310 (shown in FIG. 3) with the MU cable bus 310 providing the network connection 118. The MU cable bus 300 may be used for transferring non-network data and network data between the powered units 108, 110 (shown in FIG. 1) in the locomotive consist 114 (shown in FIG. 1). In one embodiment, the "non-network" data may include control information or other information, which is not packet data or packetized data, used in the rail vehicle consist 102 or the locomotive consist 114 (shown in FIG. 1) for control purposes. Conversely, "network" data may include control information or other information that is packet data or packetized data.

Figure 4:
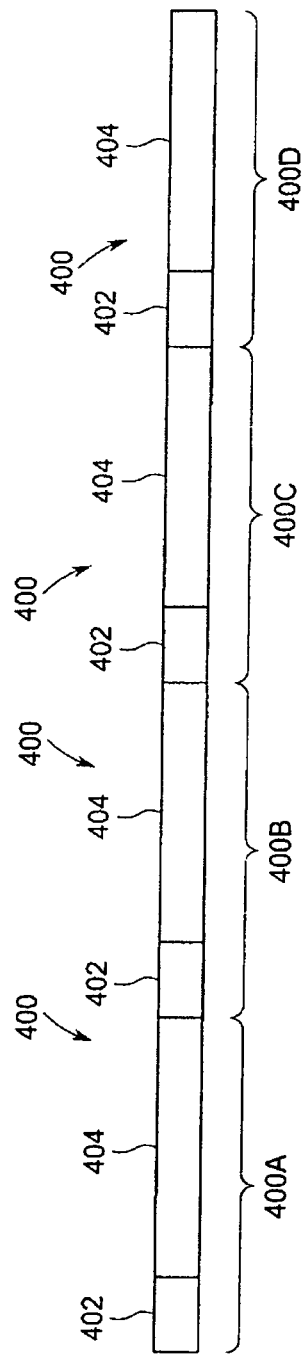
FIG. 4 is a schematic diagram of several data packets that are used to communicate network data in the communication system shown in FIG. 1 in one embodiment.

FIG. 4 is a schematic diagram of several data packets 400 that are used to communicate network data in the communication system 100 shown in FIG. 1 in one embodiment. The data packets 400 represent sequential groups of data bits that represent part of a digitally transmitted message. The data packets 400 are individually labeled 400A, 400B, and so on in FIG. 4. The data packet 400 includes a header section 402 and a payload section 404. The header section 402 comprises identifying information about the message and/or data packet 400. For example, the header section 402 may include the unique address of a recipient of the data packet 400, an indication of the length or number of bits in the data packet 400, the priority of the data contained in the data packet 400, the sequence of the data packet 400 relative to other data packets 400, and/or the unique address of the device that transmitted the data packet 400. The payload section 404 includes data representative of the message being conveyed by the data packets 400. For example, the payload section 404 can include data bits representative of the message that is conveyed by the data packets 400.

Returning to the discussion of the communication system 100 shown in FIG. 2, the network data may be communicated through the network connection 118 of the communication system 100 using the data packets 400. Conversely, the non-network data may be communicated through the network connection 118 using non-packetized data or data that does not include addressing information, such as a data that is not transmitted in data packets 400 and/or does not include a recipient or transmitter address that is communicated in the header portion 402 of the data packet 400.

In another aspect, non-network data is low bandwidth or very low bandwidth. The non-network data may be transmitted over the network connection 118 (such as the MU cable bus 300 shown in FIG. 3) according to a designated voltage carrier signal (e.g., a 74 volt on/off signal, wherein 0V represents a digital "0" value and +74 volts a digital "1" value or an analog signal 0 to 74 volts, wherein the 0 to 74 volt voltage level may represent a specific level or percentage of functionality).

The communication units 120, 126 of the communication system 100 include transceiver units 200, 202 that receive and/or transmit network data using the antenna modules 122 of the corresponding communication unit 120, 126. The transceiver units 200, 202 are each electrically coupled to the network connection 118, such as the MU cable bus 300 (shown in FIG. 3). The transceiver units 200, 202 transmit and/or receive network data over the network connection 118.

In the illustrated embodiment, the transceiver unit 200 is disposed on the lead powered unit 108 (shown in FIG. 1) and the transceiver units 202 are disposed on different trailing powered units 110 (shown in FIG. 1).

The transceiver units 200, 202 receive network data from the antenna module 122 that is coupled with the transceiver unit 200, 202. For example, the one or more of the antenna modules 122 may receive all or part of a message that is digitally and wirelessly transmitted from the off-board device 104 (shown in FIG. 1) to the antenna modules 122. Different antenna modules 122 may receive different sets or subsets of data packets 400 forming the message that is transmitted by the off-board device 104. For example, if a message contains 100 sequential data packets, the antenna module 122 of the lead communication unit 120 may receive data packets 400A and 400C, the antenna module 122 of a first trailing communication unit 126 may receive data packets 400C and 400D, and the antenna module 122 of a second, different trailing communication unit 126 may receive the data packets 400B, 400C, 400D. The same data packets that are received by two or more antenna modules 122 are referred to as duplicative data packets. For example, the data packets 400C and 400D are duplicative data packets received by a plurality of the antenna modules 122.

The transceiver units 200, 202 may modulate the received network data into modulated network data for transmission over the network connection 118, such as over the MU cable bus 300 (shown in FIG. 3). Similarly, the transceiver units 200, 202 may receive modulated network data over the network connection from another transceiver unit 200, 202 and de-modulate the received modulated network data into network data. "Modulated" means converted from one form to a second, different form suitable for transmission over the network connection 118. "De-modulated" means converted from the second form back into the first form.

In one embodiment, the modulated network data is orthogonal to the non-network data transferred between the powered units 108, 110 (shown in FIG. 1) over the network connection 118. "Orthogonal" means that the modulated network data does not interfere with the non-network data, and that the non-network data does not interfere with the modulated network data (at least not to the extent that would corrupt the data).

The network data may be TCP/IP-formatted or SIP-formatted data, however, other communications protocols may be used. As should be appreciated, the communication units 120, 126 and the network connection 118 together form a local area network. In one embodiment, these components are configured to form an Ethernet network.

In the embodiment shown in FIG. 2, the transceiver units 200, 202 include routing modules 204 and modulator modules 206. The transceiver unit 200 of the lead powered unit 108 (shown in FIG. 1) also may include an arbitration module 208. The modules 204, 206, 208 of the transceiver unit 200 and the modules 204, 206 of the transceiver unit 202 are electrically connected with each other. In the example shown in FIG. 2, the modulator modules 206 are electrically connected to the network connection 118 by the central terminal board 318 of each powered unit 108, 110 (shown in FIG. 1). Alternatively, the modulator modules 206 may be directly coupled with the network connection 118 or include other components that couple the modulator modules 206 with the network connection 118. The modules 204, 206, 208 may be embodied in one or more computer processors, microprocessors, controllers, microcontrollers, other logic based devices, and the like, that operate based on one or more sets of instructions stored on computer readable storage media. For example, the modules 204, 206, 208 of each transceiver unit 200, 202 may be embodied in software or hardware applications stored on a tangible and non-transitory computer readable storage medium, such as a hard drive, RAM, ROM, or EEPROM. The reference numbers 204, 206, 208 may represent the modules, the processors or other logic based devices, and/or the media on which the sets of instructions are stored.

The routing modules 204 are communicatively coupled to interface units 210 that are part of and/or operably connected to the electronic components 312 of the powered units 108, 110 (shown in FIG. 1). In one embodiment, the electronic components 312 may be, for example, computers, processors, controllers, and the like, for controlling tractive operations of the propulsion subsystems 116 (shown in FIG. 1) of the powered units 108, 110.

The routing modules 204 and interface units 210 can be communicatively interconnected by network cables 212. For example, if the routing modules 204 and the interface units 210 are configured as an Ethernet local area network, the network cables 212 may be a CAT-5E cable. The interface units 210 are functionally connected to one or more software or hardware applications stored and/or running on computer readable storage media 214, such as a tangible and non-transitory memory. Examples of such memories include computer hard drives, RAM, ROM, EEPROM, and the like. In one embodiment, the interface units 210, network cables 212, and media 214 include standard Ethernet-ready (or other network) components. For example, if the electronic component 312 is a computer unit, the interface unit 210 may be an Ethernet adapter connected to computer unit for carrying out network communications.

The routing module 204 receives network data from the corresponding antenna module 122. The routing module 204 examines the network data to determine the recipient of the network data. For example, the routing module 204 may determine if the data packets 400 (shown in FIG. 4) of the network data are addressed to another communication unit 120, 126 or routing module 204. The powered units 108, 110 (shown in FIG. 1), communication units 120, 126, and/or routing modules 204 may each be associated with different, unique addresses. The header section 402 (shown in FIG. 4) of the received data packets 400 may identify the powered unit 108, 110, communication unit 120, 126, and/or routing module 204 that is the addressed recipient of the data packet 400. The routing module 204 determines the addressed recipient of the data packet 400 and communicates the data packet 400 and the addressed recipient to the modulator module 206.

The modulator modules 206 modulate the received network data into modulated network data and transmit the modulated network data over the network connection 118. The modulator modules 206 communicate the modulated network data to the addressed recipient of the data packets 400 (shown in FIG. 4). In one embodiment, the modulator modules 206 of the trailing communication units 202 transmit the data packets 400 to the lead communication unit 120 while the modulator module 206 of the lead communication unit 120 retains the data packets 400 and does not transmit the data packets 400 to another communication unit 126.

The off-board device 104 (shown in FIG. 1) may transmit the message contained in the data packets 400 to all or several of the antenna modules 122 to increase the probability that at least one antenna module 122 receives each data packet 400 of the message. As the antenna module 122 of the different communication units 120, 126 receive the various data packets 400, the communication units 120, 126 convey the data packets 400 to the addressed recipient of the data packets 400, such as the lead communication unit 120. Alternatively, the communication units 120, 126 may transmit the received data packets 400 to the lead communication unit 120 regardless of the addressed recipient of the data packets 400.

The modulator module 206 of the lead communication unit 120 (referred to as the "lead modulator module") receives the modulated network data transmitted from other communication units 202 over the network connection 118. The lead modulator module 206 de-modulates the modulated network data into network data, which is then conveyed to the arbitrator module 208. The antenna module 122 of the lead communication unit 120 may receive one or more data packets 400 (shown in FIG. 4) of the message transmitted by the off-board device 104 (shown in FIG. 1). The received data packets 400 are conveyed to the arbitration module 208.

The routing module 204 and/or the modulator module 206 of one or more of the communication units 120, 126 may perform various processing steps on the network data and/or the modulated network data for transmission and reception both over the network connection 118 and/or the network cable 212. Additionally, one both of the routing module 204 and/or the modulator module 206 of the communication units 120, 126 may perform network data routing functions.

The modulator modules 206 may be communicatively coupled with an electrical output (e.g., port, wires) for electrical connection to the network connection 118, and/or internal circuitry (e.g., electrical and isolation components, microcontroller, software/firmware) for receiving network data from the routing module 204, modulating the network data into modulated network data, transmitting the modulated network data over the network connection 118, receiving modulated network data over the network connection 118, de-modulating the modulated network data into network data, and communicating the network data to the routing module 204. The internal circuitry may be configured to modulate and de-modulate data using schemes such as those utilized in VDSL or VHDSL (very high bitrate digital subscriber line) applications, or in power line digital subscriber line (PDSL) applications. One example of a suitable modulation scheme is orthogonal frequency-division multiplexing (OFDM). OFDM is a frequency-division multiplexing scheme wherein a large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The modulation or communication scheme may involve applying a carrier wave (at a particular frequency orthogonal to frequencies used for non-network data in the MU cable bus) and modulating the carrier wave using digital signals corresponding to the network data.

In one embodiment, the modulation modules 208 transmit the data packets 400 based on priority indices associated with the data packets 400. The priority index represents a precedence of one data packet 400 or a group of data packets 400 relative to one or more other data packets 400. The modulator modules 206 may transmit the data packets 400 having a greater priority index (indicating a higher precedence) before transmitting data packets 400 having lesser priority indices (representative of lower precedence).

The modulator modules 206 may transmit the data packets 400 may be based on a Quality of Service (QoS) characteristic of the network connection 118. The QoS characteristic is a measurement or other representation of the ability of the network connection 118 or a channel of the network connection 118 to transmit network data at a predetermined transmission rate, data flow, throughput, or bandwidth. For example, the QoS characteristic for the network connection 118 or a channel of the network connection 118 may be a comparison of the actual transmission rate of the network connection 118 or channel with a predetermined threshold transmission rate of the network connection 118 or channel. Alternatively, the QoS characteristic may be a measurement of dropped data packets 400 that are transmitted through the network connection 118 or channel, a delay or latency of transmission of the data packets 400 along the network connection 118 or channel, jitter or delays among the data packets 400, an order of delivery of the various data packets 400, and/or an error in transmitting one or more of the data packets 400.

The priority index of the data packets 400 and the QoS characteristic of the network connection 118 or channel may be used by the modulator modules 206 to determine which data packets 400 are transmitted. For example, when the QoS characteristic of the network connection 118 or a channel falls below a threshold, then only the data packets 400 having a priority index that exceeds another threshold may be transmitted.

Figure 5:
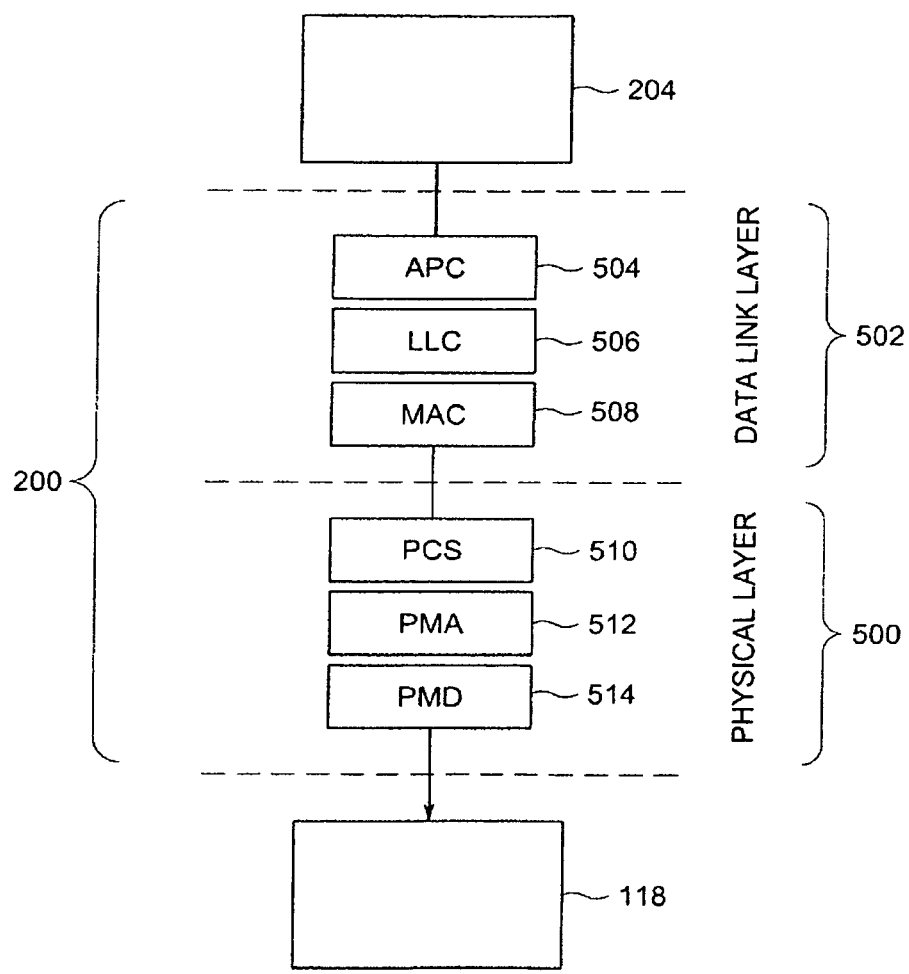
FIG. 5 shows one example of how modulator modules shown in FIG. 2 can function, cast in terms of the Open Systems Interconnection (OSI) network model, according to one embodiment.

FIG. 5 shows one example of how the modulator modules 206 can function, cast in terms of the Open Systems Interconnection (OSI) network model, according to one embodiment. In this example, the modulator modules 206 include a physical layer 500 and a data link layer 502. The data link layer 502 is divided into sub-layers. The first sub-layer is an application protocol convergence (APC) layer 504. The APC layer 504 accepts Ethernet (or other network) frames from an upper application layer (e.g., the routing module 204) and encapsulates them into MAC (medium access control) service data units, which are transferred to a logical link control (LLC) layer 506. The LLC layer 506 is responsible for potential encryption, aggregation, segmentation, automatic repeat-request, and similar functions. A third sub-layer of the data link layer 502 is a MAC layer 508, which schedules channel access.

The physical layer 500 is divided into multiple sub-layers. One sub-layer is a physical coding sub-layer (PCS) 510, which is responsible for generating PHY (physical layer) headers. A second sub-layer is a physical medium attachment (PMA) layer 512, which is responsible for scrambling and FEC (forward error correction) coding/decoding. A third sub-layer is a physical medium dependent (PMD) layer 514, which is responsible for bit-loading and OFDM modulation. The PMD layer 514 is configured for interfacing with the network connection 118, according to the particular configuration (electrical or otherwise) of the network connection 118. The other sub-layers may be medium independent, i.e., do not depend on the configuration of the network connection 118.

Figure 6:
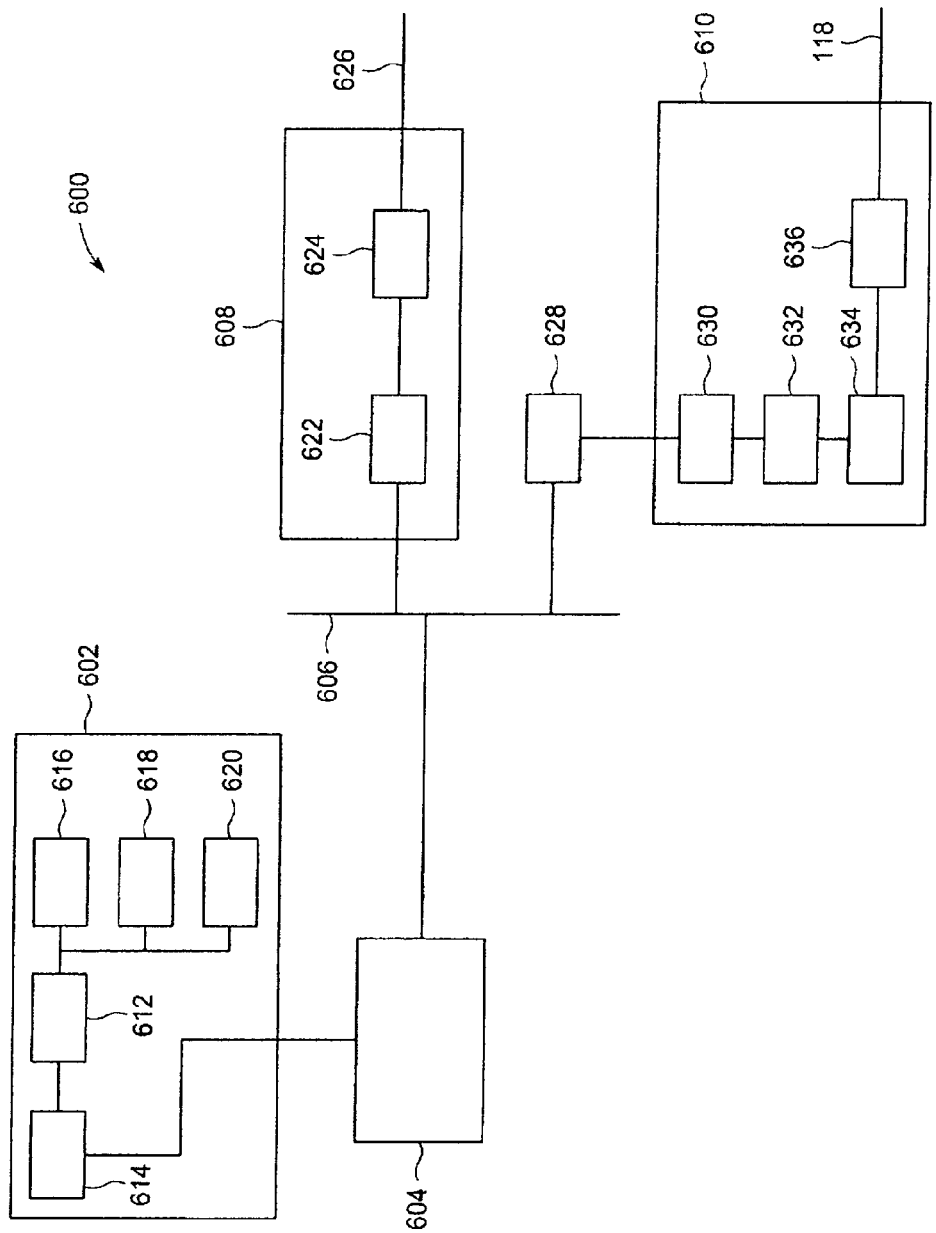
FIG. 6 is a circuit diagram of another embodiment of a communication unit.

FIG. 6 is a circuit diagram of another embodiment of a communication unit 600. The communication unit 600 may be used in place of one or more of the communication units 120, 126 (shown in FIG. 2). The communication unit 600 includes a control unit 602, a switch 604, a main bus 606, a network interface portion 608, and a Very-high-bitrate Digital Subscriber Line (VDSL) module 610. The control unit 602 includes a controller 612, such as a processor or other logic based device, and a control unit bus 614. The controller 612 is electrically connected to the control unit bus 614 for communicating data over the bus 614. The control unit 602 may include several modules, such as a routing module 616, a modulation module 618, and/or an arbitration module 620.

The modules 616, 618, 620 may be similar to the modules 204, 206, 208 (shown in FIG. 2) described above and perform similar functions.

The switch 604 is a network switching/router module configured to process and route packet data and other data. The switch 604 interfaces the control unit 602 with the main bus 606. The switch 604 may be, for example, a layer 2/3 multi-port switch. The network interface portion 608 is electrically connected to the main bus 606, and comprises an octal PHY (physical layer) portion 622 and a network port portion 624. The network port portion 624 is electrically connected to the octal PHY portion 622. The octal PHY portion 622 may comprise a 10/100/1000 Base T 8-port Ethernet (or other network) transceiver circuit. The network port portion 624 may comprise an Ethernet (or other network) transformer and associated CAT-5E receptacle (or other cable type receptacle) for receiving a network cable 626.

The VDSL module 610 also is connected to the main bus 606 by way of an octal PHY unit 628, which may be the same unit as the octal PHY portion 622 or a different octal PHY unit. The VDSL module 610 comprises a physical interface portion (PHY) 630 electrically connected to the octal PHY unit 628, a VDSL control 632 electrically connected to the physical interface portion 630, a VDSL analog front end unit 634 electrically connected to the VDSL control 632, and a VDSL port unit 636 electrically connected to the VDSL analog front end unit 634. The VDSL port unit 636 may be communicatively coupled with the network connection 118. The physical interface portion 630 acts as a physical and electrical interface with the octal PHY unit 628, e.g., the physical interface portion 630 may comprise a port and related support circuitry. The VDSL analog front end unit 634 is configured for transceiving modulated network data (e.g., sending and receiving modulated data) over the network connection 118, and may include one or more of the following: analog filters, line drivers, analog-to-digital and digital-to-analog converters, and related support circuitry (e.g., capacitors).

The VDSL control 632 is configured for converting and/or processing network data for modulation and de-modulation, and may include a microprocessor unit, ATM (asynchronous transfer mode) and IP (Internet Protocol) interfaces, and digital signal processing circuitry/functionality. The VDSL port unit 636 provides a physical and electrical connection to the network connection 118, and may include transformer circuitry, circuit protection functionality, and a port or other attachment or connection mechanism for connecting the VDSL module 610 to the network connection 118. Overall operation of the communication unit 600 shown in FIG. 6 is similar to what is described in relation to FIG. 2.

Returning to the discussion of the communication system 100 shown in FIG. 2, once the lead communication unit 120 receives the data packets 400 (shown in FIG. 4) forming a message from the off-board device 104 (shown in FIG. 1), the arbitration module 208 examines the data packets 400 to form the message. In one embodiment, the arbitration module 208 sequentially arranges the data packets 400 based on identifying information in the header section 402 (shown in FIG. 4) of the data packets 400. The arbitration module 208 may eliminate duplicative data packets 400. For example, the arbitration module 208 may discard multiple instances of the same data packet 400 that is received from two or more of the trailing communication units 202. The data packets 400 are re-constituted or combined into the message transmitted by the off-board device 104. The combined data packets 400 may be referred to as a "reconstituted network message."

The lead communication unit 120 may be referred to as the arbitrating communication unit as the lead communication unit 120 may receive the data packets 400 (shown in FIG. 4), eliminate duplication of the data packets 400, and arrange the data packets 400 into the message. Alternatively, a trailing communication unit 126 may be the arbitrating communication unit. For example, the trailing communication unit 126 of a trailing powered unit 110 (shown in FIG. 1) may include the arbitration module 208 that receives the data packets 400 from the other communication units 120, 126, eliminates duplication of data packets 400, and reconstitutes the message from the data packets 400.

After the arbitration module 208 forms the reconstituted network message from the received data packets 400 (shown in FIG. 4), the arbitration module 208 determines where to transmit the reconstituted network message. For example, the reconstituted network message may include control instructions to direct operations of the propulsion subsystems 116 (shown in FIG. 1) of one or more of the powered units 108, 110 (shown in FIG. 1). The arbitration module 208 identifies the powered units 108, 110 to which the reconstituted network message is addressed based on one or more of the data packets 400 and directs the routing and/or modulation modules 204, 206 of the lead communication unit 126 to transmit the reconstituted network message as network data to the addressed powered units 108, 110. The modulation module 206 may communicate the reconstituted message in the data packets 400 to the communication unit 126 of the addressed powered unit 108, 110 via the network connection 118.

In one embodiment, the arbitration module 208 directs the modulation module 206 to transmit the message to the addressed powered units 108, 110 based on a priority index associated with the message. The priority index represents a precedence of the message relative to one or more other messages. The arbitration module 208 may direct the modulator module 206 to transmit messages having greater priority indices (indicating higher precedence) before transmitting messages having lesser priority indices (representative of lower precedence).

The arbitration module 208 may direct the modulation module 206 to transmit a message may be based on a Quality of Service (QoS) characteristic of the network connection 118. The QoS characteristic is a measurement or other representation of the ability of the network connection 118 or a channel of the network connection 118 to transmit network data at a predetermined transmission rate, data flow, throughput, or bandwidth. For example, the QoS characteristic for the network connection 118 or a channel of the network connection 118 may be a comparison of the actual transmission rate of the network connection 118 or channel with a predetermined threshold transmission rate of the network connection 118 or channel. Alternatively, the QoS characteristic may be a measurement of dropped data packets 400 that are transmitted through the network connection 118 or channel, a delay or latency of transmission of the data packets 400 along the network connection 118 or channel, jitter or delays among the data packets 400, an order of delivery of the various data packets 400, and/or an error in transmitting one or more of the data packets 400.

The priority index of a message and the QoS characteristic of the network connection 118 or channel may be used by the arbitration module 208 to determine which messages are transmitted. For example, when the QoS characteristic of the network connection 118 or a channel falls below a threshold, then only the messages having a priority index that exceeds another threshold may be transmitted.

The trailing communication units 202 that receive the reconstituted network message through the network connection 118 convey the message to the electronic components 312 of the associated powered unit 110 (shown in FIG. 1). The electronic components 312 may include devices that control tractive and/or braking efforts supplied by the propulsion subsystem 116 (shown in FIG. 1) of the trailing powered unit 110 that receives the reconstituted network message. The reconstituted network message may be stored in the computer readable storage medium 214. The electronic components 312 use the information contained in the reconstituted network message to control tractive and/or braking operations of the trailing powered unit 110.

If all or part of the reconstituted network message is addressed to the lead powered unit 108 (shown in FIG. 1), then the arbitration module 208 may convey the reconstituted network message to the electronic component 312 of the lead powered unit 108. As described above, the electronic component 312 may use the reconstituted network message to control operations of the propulsion subsystem 116 (shown in FIG. 1) of the lead powered unit 108.

In another embodiment, the message that is transmitted by the off-board device 104 (shown in FIG. 1) to the antenna modules 122 of the rail vehicle consist 102 (shown in FIG. 1) includes a trip profile. The trip profile includes tractive and/or braking settings for one or more of the powered units 108, 110 to follow during an upcoming trip of the rail vehicle consist 102 over a route between a starting location and a finishing location. The tractive and/or braking settings may dictate speeds of the rail vehicle consist 102 at various locations along the route. The trip profile is used by the propulsion subsystems 116 of the powered rail vehicles 108, 110 to control or change the speed of the rail vehicle consist 102. For example, the trip profile can include the speed and/or power settings for the rail vehicle consist 102 to follow or abide by, which may be expressed as functions of distance and/or time from the starting location, operating limits of the rail vehicle consist 102 (such as power, brake, or speed limits), expected fuel consumed, emissions generated, and the like. The trip profile can be based on a variety of input information, such as the location of the rail vehicle consist 102, the type and/or model of the powered units 108, 110 in one or more consists of the rail vehicle consist 102, the tractive power of the rail vehicle consist 102 and/or one or more of the powered units 108, 110, the performance of the propulsion subsystems 116 of the powered units 108, 110, consumption of engine fuel as a function of output power by the powered units 108, 110, cooling characteristics of the propulsion subsystems 116, the intended trip route (including effective track grade, actual track grade, location of curves and track switches along the route as a function of milepost, car makeup and loading (including effective drag coefficients), desired trip parameters including, but not limited to, start time and location, end location, travel time, crew (user and/or operator) identification, crew shift expiration time, and trip route, for example.

In one embodiment, the trip profile can be used in conjunction with a software application, such as the Trip Optimizer™ software provided by General Electric Company, during an upcoming trip of the rail vehicle consist 102 over a predetermined route. As described above, the trip profile may dictate settings of the propulsion subsystems 116 during the future trip of the rail vehicle consist 102. The trip profile is used to reduce fuel consumption and/or emissions from the rail vehicle consist 102 during the trip.

The trip profile is transmitted to the antenna modules 122 by the off-board device 104 (shown in FIG. 1) as one or more messages. As described above, the data packets 400 (shown in FIG. 4) of the message are conveyed to the lead communication unit 120 and reconstituted into the message. The lead communication unit 120 conveys the message to the electronic components 312 of the trailing powered units 110 over the network connection 118 and/or to the electronic components 312 of the lead powered unit 108. The electronic components 312 use the trip profile in order to determine how to control and/or change tractive and/or braking efforts provided by the different propulsion subsystems 116 as the rail vehicle consist 102 traverses the route of the trip. For example, based on the message, one or more of the propulsion subsystems 116 may increase the tractive effort when an upcoming segment of the trip includes an incline.

In order to receive the message from the off-board device 104 (shown in FIG. 1), an initialization request may be transmitted by one or more of the antenna modules 122. For example, prior to receiving the trip profile from the off-board device 104, the lead communication unit 120 may form and transmit an initialization request to the off-board device 104 using the antenna module 122 of the lead communication unit 120. Alternatively, a plurality of the antenna modules 122 may transmit the initialization request to the off-board device 104 to increase the probability that the request is received. Following receipt of the request, the off-board device 104 may transmit the message or messages containing the trip profile to the antenna modules 122 of the rail vehicle consist 102 (shown in FIG. 1).

The initialization request may be formed by the routing module 204 of the lead communication unit 120 and may include the addresses of one or more of the antenna modules 122. For example, the antenna modules 122 of one rail vehicle consist 102 may have addresses that are different than the addresses of the antenna modules of another rail vehicle. In order to prevent the trip profile from being received by another rail vehicle, the trip profile may be transmitted with the addresses of the antenna modules 122 that are intended to receive the trip profile. Alternatively, the rail vehicles may be associated with different addresses and the trip profile may be transmitted with the address of the rail vehicle that is intended to receive the trip profile.

In another embodiment, the message may be non-trip and non-tractive control related information. For example, the message may be other data such as voice over IP ("VoIP") data used to communicate a verbal message to human operators or passengers on the rail vehicle consist 102 (shown in FIG. 1), data related to cargo or commodities being transported by the rail vehicle consist 102, or other information.

In any of the embodiments herein, the network data transmitted over the network connection 118, such as data communicated between the communication units 120, 126, may be "high bandwidth" data, meaning data transmitted at average rates of at least 10 megabytes per second. Conversely, the data transmitted from the off-board device 104 (shown in FIG. 1) to the antenna modules 122 may be transmitted at a rate that is slower than high bandwidth data. For example, the data transmitted to the antenna modules 122 may be transmitted as "low bandwidth" data, or data transmitted at an average rate of 1,200 bits per second, or slower. Alternatively, the network data transmitted over the network connection 118 may be transmitted as low bandwidth data.

Figure 7:
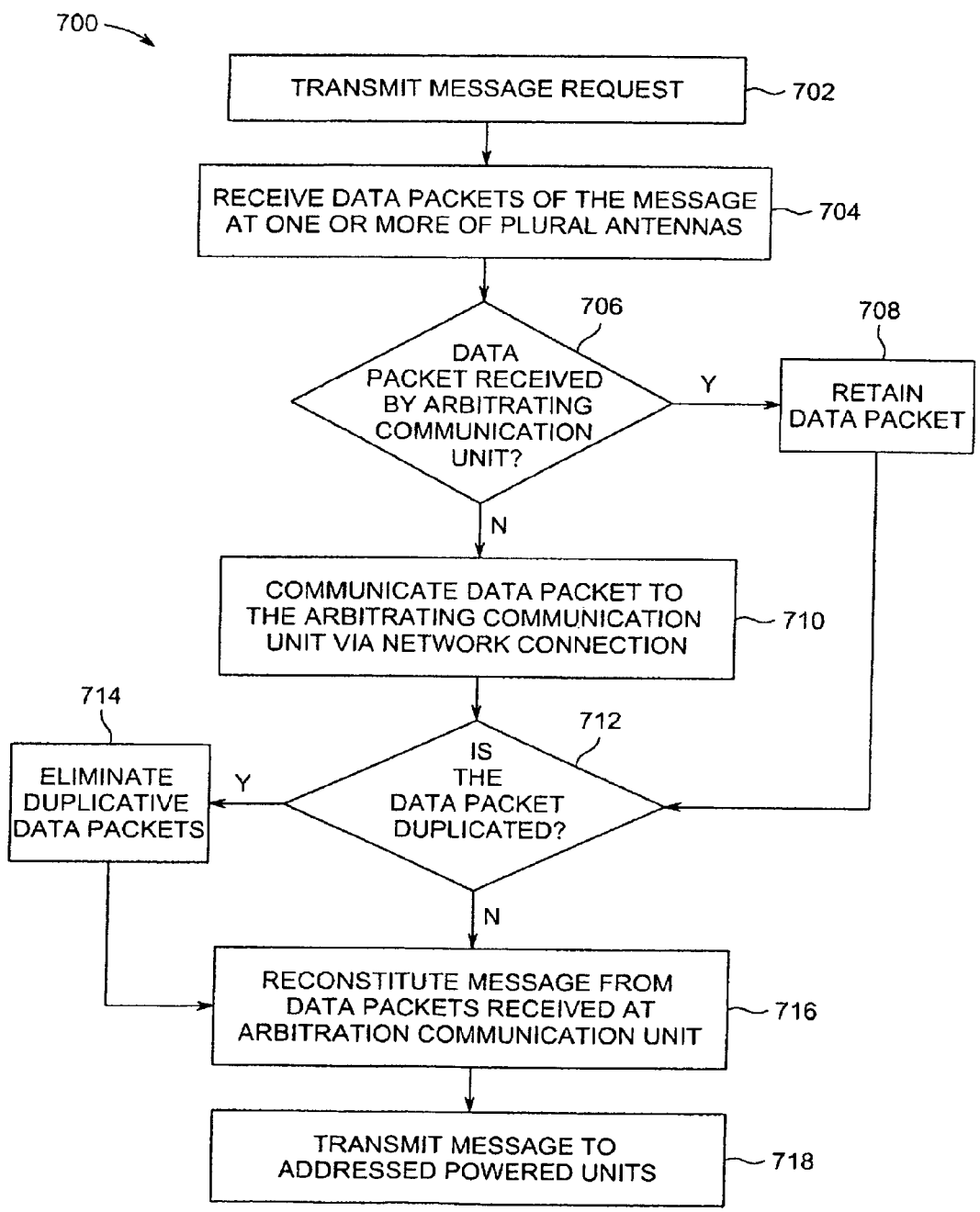
FIG. 7 is a flowchart of one embodiment of a method for communicating with a rail vehicle consist.

FIG. 7 is a flowchart of one embodiment of a method 700 for communicating with a rail vehicle. The method 700 may be used to communicate a message from off-board of a rail vehicle to one or more powered units of the rail vehicle, similar to as described above. The method 700 may be used in conjunction with the communication system 100 (shown in FIG. 1) described above.

At 702, a message request is transmitted from the rail vehicle. For example, one or more of the communication units 120, 126 (shown in FIG. 2), such as the arbitrating communication unit, may wirelessly transmit a request to the off-board device 104 (shown in FIG. 1) for data or information. In one embodiment, the request is for tractive control information related to an upcoming trip of the rail vehicle consist 102 (shown in FIG. 1), such as data that can be used with software that manages tractive and/or braking effort of the rail vehicle consist 102 during an upcoming trip (e.g., General Electric Company's Trip Optimizer™ software). The message is transmitted by the off-board device 104 as a series of data packets, such as the data packets 400A, 400B, 400C, 400D shown in FIG. 4.

At 704, the data packets are received at one or more of plural antenna modules of the rail vehicle. For example, one or more of the antenna modules 122 (shown in FIG. 1) may receive subsets or all of the data packets 400 (shown in FIG. 4) of a message transmitted by the off-board device 104 (shown in FIG. 1). Different antenna modules 122 may receive overlapping subsets of the data packets 400 in the message. For example, a first antenna module 122 may receive data packets 400A and 400B, a second antenna module 122 may receive data packets 400B, 400C, and 400D, and a third antenna module 122 may receive data packet 400D.

At 706, a determination is made as to whether one or more of the data packets is received by the antenna module of the arbitrating communication unit. If a data packet is received by a communication unit other than the arbitrating communication unit, then the communication unit that received the data packet may need to transmit the data packet to the arbitrating communication unit. As a result, flow of the method 700 proceeds to 710. Alternatively, if a data packet is received by the arbitrating communication unit, then the arbitrating communication unit may not need to transmit the data packet to any other communication unit at this time. As a result, flow of the method 700 can proceed to 708.

At 708, the arbitrating communication unit retains the data packet. For example, as the arbitrating communication unit received the data packet, the data packet does not need to be transmitted to the arbitrating communication unit. Flow of the method 700 proceeds from 708 to 712.

At 710, the data packet is communicated to the arbitrating communication unit via a network connection. For example, the data packet 400 (shown in FIG. 4) may be communicated from the receiving communication unit 126 (shown in FIG. 2) to the arbitrating communication unit 120 (shown in FIG. 2). The data packet 400 can be conveyed along the network connection 118 (shown in FIG. 1), such as a connection that allows high bandwidth data rate communication and/or is included in an existing connection of the rail vehicle 101 (shown in FIG. 1), such as the MU cable 300 (shown in FIG. 3).

At 712, the arbitrating communication unit determines if one or more of the data packets are duplicative of each other. For example, two or more antenna modules 122 (shown in FIG. 1) may receive the same data packets from the off-board device 104 (shown in FIG. 1). The arbitrating communication unit identifies which data packets are duplicated. If the data packets are not duplicative, then flow of the method 700 proceeds to 716. Alternatively, if one or more data packets are duplicated, then the duplicative data packets may need to be discarded or not included in the message. As a result, flow of the method 700 proceeds to 714.

At 714, the duplicated data packets are eliminated. For example, if the first antenna module 122 (shown in FIG. 1) receives data packets 400A and 400B (shown in FIG. 4), the second antenna module 122 received data packets 400B, 400C, and 400D, and the third antenna module 122 received data packet 400D and all of these data packets 400 were conveyed to the arbitrating communication unit 120 (shown in FIG. 1), then the arbitrating communication unit 120 may determine that multiple data packets 400B and data packets 400D were received. The arbitrating communication unit 120 may discard all but one of the duplicated data packets 400B and all but one of the duplicated data packets 400D.

At 716, the message is reconstituted from the data packets received at the arbitration communication unit. For example, the non-duplicated data packets 400 (shown in FIG. 4) that are received by one or more antenna modules 122 (shown in FIG. 1) along the length of the rail vehicle consist 102 (shown in FIG. 1) and transmitted to the arbitrating communication unit 120 (shown in FIG. 1) via the network connection 118 (shown in FIG. 1) may be combined into the message transmitted by the off-board device 104 (shown in FIG. 1).

At 718, the reconstituted message is transmitted to one or more of the powered units of the rail vehicle. For example, the arbitrating communication unit 120 (shown in FIG. 1) may transmit the reconstituted message to the communication units 120, 126 (shown in FIG. 1) coupled with propulsion subsystems 116 (shown in FIG. 1) of the lead and/or trailing powered units 108, 110 (shown in FIG. 1). The message may then be interpreted by the communication units 120, 126 to control the tractive and/or braking efforts provided by the propulsion subsystems 116.

One or more embodiments described herein provide systems and methods for communicating with a rail vehicle consist. The systems and methods increase the probability that a wirelessly transmitted message is received by the rail vehicle consist. For example, by increasing the number of locations along the rail vehicle consist at which one or more fragments or subsets of the message may be received as data packets, the probability that the entire message will be received increases. The systems and methods also provide for reconstituting the fragments or subsets of the message into the message so that the information contained in the message may be used to control operations in the rail vehicle consist. In one embodiment, the systems and methods may be used on existing rail vehicle consists and existing communication systems of a rail vehicle consist. For example, existing antenna modules on locomotives may be coupled with each other via an existing MU cable (or one or more antenna modules may be added to the locomotives and coupled via the MU cable). The antenna modules can receive the data packets of the message and convey the data packets via the MU cable to an arbitrating communication unit that reconstitutes the message from the data packets.

In one embodiment, a communication system for a rail vehicle consist is provided. The communication system includes antennas, routing modules, and an arbitration module. The antennas are configured to be disposed at spaced apart locations along the rail vehicle consist and to receive network data from an off-board device. The routing modules are communicatively coupled with the antennas and are configured to receive the network data from the antennas. The routing modules are communicatively coupled with a network connection extending along the rail vehicle consist. The arbitration module is communicatively coupled with the network connection. The arbitration module is configured to form a message represented by the network data. One or more of the routing modules transmits the network data received from the off-board device to the arbitration module over the network connection. The arbitration module receives the network data to form the message and transmits the message to one or more powered units of the rail vehicle consist through the network connection.

In another aspect, the antennas are configured to be disposed on different powered units of the rail vehicle consist.

In another aspect, the routing modules are configured to be disposed on different trailing powered units of a locomotive consist in the rail vehicle consist and the arbitration module is configured to be disposed on a lead powered unit of the locomotive consist.

In another aspect, the arbitration module transmits the message to the trailing powered units in the locomotive consist to control tractive operations of the trailing powered units.

In another aspect, the routing modules are configured to receive different subsets of data packets from the antennas. The routing modules transmit the different subsets of the data packets to the arbitration module through the network connection. The arbitration module is configured to reconstitute the different subsets of the data packets into the message.

In another aspect, the arbitration module is configured to eliminate duplication of one or more of the same subsets of the data packets sent by a plurality of the routing units when the arbitration reconstitutes the data packets into the message.

In another aspect, the routing modules and the arbitration module are configured to be communicatively coupled with each other through a high bandwidth network connection.

In another aspect, the routing modules and the arbitration module are configured to be communicatively coupled with a cable bus that provides the network connection.

In another aspect, the routing modules and the arbitration module are communicatively coupled by a wireless connection as the network connection.

In another aspect, the arbitration module communicates the network data to a lead powered unit of the rail vehicle consist and the network data includes tractive control instructions related to an upcoming trip of the rail vehicle consist and used to control the lead powered unit during the upcoming trip.

In another aspect, the arbitration module communicates the network data to one or more trailing powered units of the rail vehicle consist and the network data includes positive train control instructions related to at least one of tractive effort or braking effort supplied by the one or more trailing powered units.

In another aspect, the antennas are configured to receive the network data from a wayside device.

In another embodiment, a method for communicating with a rail vehicle consist is provided. The method includes receiving network data from an off-board device at one or more of a plurality of antennas disposed at spaced apart locations along the rail vehicle consist. The method also includes communicating the network data to an arbitration module through a network connection that extends along the rail vehicle consist and forming a message from the network data received over the network connection at the arbitration module. The method further includes transmitting the message to one or more powered units of the rail vehicle consist through the network connection.

In another aspect, the receiving step includes receiving the network data at the antennas disposed on different powered units of the rail vehicle consist.

In another aspect, the method also includes controlling tractive operations of one or more of the powered units using the message that is transmitted by the arbitration module.

In another aspect, the receiving step includes wirelessly receiving the network data from the off-board device.

In another aspect, the receiving step includes receiving different subsets of data packets that form a message of the network data. Additionally, the communicating step may include communicating the different subsets of the data packets to the arbitration module. The method may further include reconstituting the different subsets of the data packets into the message and transmitting the message to the one or more powered units through the network connection.

In another aspect, the reconstituting step includes eliminating duplication of one or more of the same subsets of the data packets sent by a plurality of the antennas.

In another aspect, at least one of the communicating or the transmitting steps includes communicating the network data through the network connection at a faster rate than the network data was received at the transceiver units.

In another aspect, at least one of the communicating or transmitting steps includes wirelessly communicating the network data.

In another aspect, the transmitting step includes transmitting the network data to a lead powered unit of the rail vehicle consist. The network data includes tractive control instructions related to an upcoming trip of the rail vehicle consist and that is used to control the lead powered unit during the upcoming trip.

In another aspect, the transmitting step includes transmitting the network data to one or more trailing powered units of the rail vehicle consist. The network data may include positive train control instructions related to at least one of tractive effort or braking effort supplied by the one or more trailing powered units.

In another aspect, the receiving step includes receiving the network data from a wayside device, such as a wayside signal device.

In another embodiment, a computer readable storage medium for a communication system of a rail vehicle consist is provided. The computer readable storage medium includes instructions for directing a processor of the communication system to receive network data transmitted by an off-board device and obtained by one or more of a plurality of antennas disposed at spaced apart locations along the rail vehicle consist. The instructions also direct the processor to examine the network data to identify a message represented by the network data and transmit the message to one or more powered units of the rail vehicle consist along a network connection extending along the rail vehicle consist based on the message.

In another aspect, the instructions direct the processor to receive the network data and transmit the message along a cable bus extending along the rail vehicle consist.

In another aspect, the message includes control instructions to direct operations of one or more of the powered units.

In another aspect, the instructions direct the processor to receive different subsets of data packets that form the message of the network data from different antennas. The instructions also may direct the processor to reconstitute the different subsets of the data packets into the message.

In another aspect, the instructions direct the processor to eliminate duplication of one or more of the same subsets of the data packets.

In another aspect, the instructions direct the processor to transmit the message to the powered units of the rail vehicle consist. The network data may include positive train control information that is configured to control one or more of tractive or braking efforts of the powered units.

Another embodiment relates to a communication method comprising receiving network data at a first rail car (e.g., locomotive or other powered unit) in a rail vehicle consist (e.g., train). The network data is received from a source off-board the rail vehicle consist. The method further comprises communicating the network data from the first rail car to a second rail car in the rail vehicle consist. The network data is communicated over a network (e.g., a wired network) interconnecting the first rail car and the second rail car. The method further comprises controlling motoring operations (e.g., throttle, braking) of the rail vehicle consist based on the network data received at the second rail car over the network. (For example, the second rail car may initiate motoring control actions of the rail vehicle consist based on the network data.) The network data includes signal information and/or traffic information. In the case of signal information, the signal information relates to one or more signals (e.g., route/traffic signals that provide indications of route conditions to passing vehicles) of a transit infrastructure over which the rail vehicle consist is travelling. For example, the signal information may include information indicating that an upcoming wayside signal device has a "red" aspect, with the off-board source thereby being the wayside signal device. In the case of traffic information, the traffic information relates to traffic conditions in the transit infrastructure (such as locations and status of other vehicles in the infrastructure) around the time the traffic information is generated. "Around" the time means at the time but for processing delays in generating the information.

In another embodiment, the network data is also received at a third rail car in the rail vehicle consist from the source off-board the rail vehicle consist. The third rail car also communicates the network data to the second rail car over the network, which interconnects the first rail car, the second rail car, and the third rail car.

Another embodiment relates to a communication method comprising receiving network data at a plurality of rail cars (e.g., locomotives or other powered units) in a rail vehicle consist (e.g., train). The network data is received from a source off-board the rail vehicle consist. The method further comprises communicating the network data from the plurality of rails cars to a first rail car (e.g., a designated rail car) in the rail vehicle consist. The network data is communicated over a network (e.g., a wired network) interconnecting the rail cars. The method further comprises controlling motoring operations (e.g., throttle, braking) of the rail vehicle consist based on the network data as received by the first rail car over the network. The network data includes signal information and/or traffic information.

Another embodiment relates to a communication method comprising receiving network data at a first rail car in a rail vehicle consist. The network data is received at the first rail car over a network from a second rail car in the rail vehicle consist. The network interconnects the first rail car and the second rail car. The network data was received by the second rail car from a source off-board the rail vehicle consist. The method further comprises, at the first rail car, controlling motoring operations of the rail vehicle consist based on the network data received over the network. The network data includes signal information and/or traffic information. In the case of signal information, the signal information relates to one or more signals of a transit infrastructure over which the rail vehicle consist is travelling. In the case of traffic information, the traffic information relates to traffic conditions in the transit infrastructure around the time the traffic information is generated.

In another embodiment, a communication system comprises a communication module. The communication module has a receiver and a router operably coupled to the receiver. The communication module is configured for deployment in a first rail car of a rail vehicle consist. The rail vehicle consist comprises the first rail car and a second rail car. The receiver is configured to receive (e.g., wirelessly receive) network data from a source off board the rail vehicle consist. The router is configured to communicate the network data, received by the receiver, to the second rail car over a network interconnecting the first rail car and the second rail car. The network data includes signal information and/or traffic information. In the case of signal information, the signal information would relate to one or more signals of a transit infrastructure over which the rail vehicle consist would travel. In the case of traffic information, the traffic information would relate to traffic conditions in the transit infrastructure around the time the traffic information is generated.

In another embodiment, a communication system comprises a control module. The control module includes a router and a control unit operably coupled to the router. The control module is configured for deployment in a second rail car of a rail vehicle consist. The rail vehicle consist comprises the second rail car and a first rail car. The router is configured to receive network data from the first rail vehicle over a network interconnecting the first rail car and the second rail car. The control unit is configured to control motoring operations of the rail vehicle consist (e.g., propulsion, braking) based on the network data received over the network.

In another embodiment, a communication system comprises a communication module and a control module. The communication module has a receiver and a first router operably coupled to the receiver. The communication module is configured for deployment in a first rail car of a rail vehicle consist. The rail vehicle consist comprises the first rail car and a second rail car. The receiver is configured to receive (e.g., wirelessly receive) network data from a source off board the rail vehicle consist. The first router is configured to communicate the network data, received by the receiver, to the second rail car over a network interconnecting the first rail car and the second rail car. The network data includes signal information and/or traffic information. In the case of signal information, the signal information would relate to one or more signals of a transit infrastructure over which the rail vehicle consist would travel. In the case of traffic information, the traffic information would relate to traffic conditions in the transit infrastructure around the time the traffic information is generated. The control module includes a second router and a control unit operably coupled to the second router. The control module is configured for deployment in the second rail car. The second router is configured to receive the network data from the first rail vehicle over the network. The control unit is configured to control motoring operations of the rail vehicle consist (e.g., propulsion, braking) based on the network data. In another embodiment, the system comprises a respective communication module for each of a plurality of rail cars in the rail vehicle consist, for communicating received network data to the second rail car. In another embodiment, the control module is configured to arbitrate the network data as received from plural rail cars over the network, e.g., reconciling or otherwise processing the network data for use in controlling the consist.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to one of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments disclosed herein, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating with a rail vehicle, without departing from the spirit and scope of the subject matter herein involved, it is intended that all of the subject matter of the above description or shown in the accompanying drawings shall be interpreted merely as examples illustrating the inventive concepts herein and shall not be construed as limiting the disclosed subject matter.

What is claimed is:

1. A communication system comprising:
  plural antenna modules configured to be disposed at spaced apart locations along a rail vehicle consist having plural powered units, the antenna modules configured to receive respective different subsets of network data from an off-board device;
  routing modules configured to be communicatively coupled with the antenna modules and configured to receive the different subsets of the network data from the respective antenna modules, the routing modules configured to be communicatively coupled with a network connection extending along the rail vehicle consist; and
  an arbitration module configured to be communicatively coupled with the network connection, the arbitration module configured to form a message represented by the network data and communicate the message to one or more of the powered units of the rail vehicle consist through the network connection, wherein one or more of the routing modules are configured to communicate the different subsets of the network data received from the off-board device to the arbitration module over the network connection, and the arbitration module is configured to receive and reconstitute the subsets of the network data to form the message to be communicated to the one or more powered units.

2. The communication system of claim 1, wherein the antenna modules are configured to be disposed on different powered units of the powered units of the rail vehicle consist.

3. The communication system of claim 1, wherein the routing modules are configured to be disposed on different trailing powered units of the powered units of the rail vehicle consist and the arbitration module is configured to be disposed on a lead powered unit of the powered units of the rail vehicle consist.

4. The communication system of claim 3, wherein the arbitration module is configured to communicate the message to the trailing powered units in the rail vehicle consist to control tractive operations of the trailing powered units.

5. The communication system of claim 1, wherein the network data is communicated in data packets and the routing modules are configured to receive the different subsets of the data packets from the antenna modules, the routing modules configured to communicate the different subsets of the data packets to the arbitration module through the network connection, and the arbitration module is configured to reconstitute the different subsets of the data packets into the message.

6. The communication system of claim 5, wherein when two or more of the antenna modules receive duplicative subsets of one or more of the different subsets of the data packets, the arbitration module is configured to eliminate duplication of the different subsets of the data packets with the duplicative subsets when the arbitration module reconstitutes the different subsets of the data packets into the message.

7. The communication system of claim 1, wherein the routing modules and the arbitration module are configured to be communicatively coupled with each other through a high bandwidth network connection.

8. The communication system of claim 1, wherein the routing modules and the arbitration module are configured to be communicatively coupled with a cable bus that provides the network connection.

9. A method comprising:
  receiving respective different subsets of network data from an off-board device at one or more of a plurality of antenna modules disposed at spaced apart locations along a rail vehicle consist having plural powered units;
  communicating the different subsets of the network data to an arbitration module through a network connection that extends along the rail vehicle consist;

forming a message from the network data by reconstituting the different subsets of the network data received over the network connection at the arbitration module; and communicating the message to one or more of the powered units of the rail vehicle consist through the network connection.

10. The method of claim 9, wherein the receiving step includes receiving the different subsets of the network data at respective antenna modules disposed on different powered units of the powered units of the rail vehicle consist.

11. The method of claim 9, further comprising controlling tractive operations of one or more of the powered units using the message that is communicated through the network connection.

12. The method of claim 9, wherein the receiving step includes wirelessly receiving the different subsets of the network data from the off-board device.

13. The method of claim 9, wherein the receiving step includes receiving the different subsets of the network data communicated in data packets, and the forming step includes reconstituting the different subsets of the data packets into the message by combining the different subsets of the data packets in order and eliminating duplicative subsets of one or more of the different subsets of the data packets received by plural antenna modules.

14. The method of claim 13, wherein at least one of the communicating steps include communicating the different subsets of the network data as data packets through the network connection, further wherein an order in which the data packets are communicated is based on at least one of priority indices of the data packets or a Quality of Service characteristic of the network connection.

15. A non-transitory computer readable storage medium comprising instructions for directing one or more processors of a communication system to:

receive different subsets of network data communicated by an off-board device and obtained by one or more of a plurality of antenna modules disposed at spaced apart locations along a rail vehicle consist having plural powered units;

reconstitute the different subsets of the network data to identify a message represented by the network data; and communicate the message to one or more of the powered units of the rail vehicle consist along a network connection extending along the rail vehicle consist based on the message.

16. The non-transitory computer readable storage medium of claim 15, wherein the instructions direct the one or more processors to receive the different subsets of the network data and communicate the message along a cable bus extending along the rail vehicle consist.

17. The non-transitory computer readable storage medium of claim 15, wherein the network data is communicated in data packets by the off-board device and the instructions direct the one or more processors to reconstitute the different subsets of the data packets into the message by combining the different subsets of the data packets in order and eliminating duplicative subsets of one or more of the different subsets of the data packets received by plural antenna modules.

18. The non-transitory computer readable storage medium of claim 15, wherein the instructions direct the one or more processors to communicate the message to the one or more powered units of the rail vehicle consist, the message including positive train control information that is configured to control one or more of tractive or braking efforts of the one or more powered units.

19. The communication system of claim 1, wherein two or more of the antenna modules are configured to receive duplicative subsets of one or more of the different subsets of the network data, the arbitration module configured to reconstitute the different subsets of the network data to form the message by sequentially arranging the different subsets of the network data based on identifying information within the different subsets of the network data and eliminating the duplicative subsets of the network data from inclusion in the message.

20. The communication system of claim 1, wherein the antenna modules are configured to be disposed on two or more different powered units of the powered units of the rail vehicle consist, the antenna modules configured to communicate the different subsets of the network data over the network connection from the two or more different powered units to the arbitration module, and the arbitration module is configured to communicate the message represented by the network data over the network connection to one or more of the powered units, wherein information contained in the message is used to control at least one of tractive operations or braking operations of the one or more powered units to which the message is communicated.

* * * * *